United States Patent
Siracusa et al.

(10) Patent No.: US 11,783,223 B2
(45) Date of Patent: Oct. 10, 2023

(54) TECHNIQUES FOR MACHINE LANGUAGE MODEL CREATION

(71) Applicant: Apple Inc., Cupertino, CA (US)

(72) Inventors: Michael R. Siracusa, Mountain View, CA (US); Alexander B. Brown, Mountain View, CA (US); Dheeraj Goswami, Cupertino, CA (US); Nathan C. Wertman, Grand Junction, CO (US); Jacob T. Sawyer, Sunnyvale, CA (US); Donald M. Firlik, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 971 days.

(21) Appl. No.: 16/670,914

(22) Filed: Oct. 31, 2019

(65) Prior Publication Data

US 2020/0380301 A1    Dec. 3, 2020

Related U.S. Application Data

(60) Provisional application No. 62/855,958, filed on Jun. 1, 2019.

(51) Int. Cl.
  *G06F 3/048* (2013.01)
  *G06N 20/00* (2019.01)
  (Continued)

(52) U.S. Cl.
  CPC ............ *G06N 20/00* (2019.01); *G06F 3/048* (2013.01); *G06F 3/0486* (2013.01); *G06F 8/34* (2013.01);
  (Continued)

(58) Field of Classification Search
  None
  See application file for complete search history.

(56) References Cited

U.S. PATENT DOCUMENTS

| | | | |
|---|---|---|---|
| 2015/0242761 A1* | 8/2015 | Amershi | G06F 3/048 706/11 |
| 2016/0042296 A1* | 2/2016 | Shan | G06F 16/9535 706/11 |

(Continued)

FOREIGN PATENT DOCUMENTS

| | | |
|---|---|---|
| CN | 108463795 | 8/2018 |
| CN | 109791631 | 5/2019 |
| TW | 201617941 | 5/2016 |

OTHER PUBLICATIONS

Article: Audrey, "Create ML Tutorial: Getting Started", Available online at; https://www.raywenderlich.com/5653-create-ml-tutorial-getting started, dated Jun. 13, 2018 in 16 pages.

(Continued)

*Primary Examiner* — Xuyang Xia
(74) *Attorney, Agent, or Firm* — KILPATRICK, TOWNSEND AND STOCKTON LLP

(57) ABSTRACT

Embodiments of the present disclosure present devices, methods, and computer readable medium for techniques for creating machine learning models. Application developers can select a machine learning template from a plurality of templates appropriate for the type of data used in their application. Templates can include multiple templates for classification of images, text, sound, motion, and tabular data. A graphical user interface allows for intuitive selection of training data, validation data, and integration of the trained model into the application. The techniques further display a numerical score for both the training accuracy and validation accuracy using the test data. The application provides a live mode that allows for execution of the machine learning model on a mobile device to allow for testing the model from data from one or more of the sensors (i.e., camera or microphone) on the mobile device.

20 Claims, 10 Drawing Sheets

(51) Int. Cl.
| | |
|---|---|
| *G06F 3/0486* | (2013.01) |
| *G06F 8/34* | (2018.01) |
| *G06F 18/214* | (2023.01) |
| *G06F 18/21* | (2023.01) |
| *G06F 18/2431* | (2023.01) |
| *G06V 10/776* | (2022.01) |

(52) U.S. Cl.
CPC ...... *G06F 18/2148* (2023.01); *G06F 18/2193* (2023.01); *G06F 18/2431* (2023.01); *G06V 10/776* (2022.01)

(56) References Cited

U.S. PATENT DOCUMENTS

2018/0246801 A1* 8/2018 Krauss .................. G06N 20/00
2018/0314939 A1* 11/2018 Skiles .................... G06N 20/10
2019/0095822 A1* 3/2019 Rugel ................ G06Q 30/0627

OTHER PUBLICATIONS

Article: Kapoor, et al., "Introducing Create ML", WWDC18, Available online at; https://developer.apple.com/videos/play/wwdc2018/703/, 2018, in 162 pages.
International Search Report and Written Opinion issued in PCT Application No. PCT/US2020/035444, dated Sep. 28, 2020 in 14 pages.
International Preliminary Report on Patentability issued in PCT Application No. PCT/US2020/035444, dated Dec. 16, 2021 in 9 pages.
Office Action issued in Taiwan Application No. TW109118351, dated Mar. 9, 2022 in 8 pages.

* cited by examiner

TECHNIQUES FOR MACHINE LANGUAGE MODEL CREATION

CROSS-REFERENCES TO RELATED APPLICATIONS

This application claims priority to and incorporates by reference commonly-owned U.S. Patent Application Ser. No. 62/855,958, filed Jun. 1, 2019, entitled "Techniques for Machine Language Model Creation," in its entirety and for all purposes.

FIELD

The present disclosure relates generally to techniques and user interfaces for generating and training machine learning models for application development.

BACKGROUND

Machine Learning techniques can be implemented by application developers to make predictions and decisions without using explicit instructions, relying on patterns and influence instead. Machine Learning techniques create a mathematical model based on sample data, known as "training data." Machine learning techniques can be employed in various applications such as email filtering, computer vision, and predictive analysis. Often the models developed for machine learning are developed using separate applications from those used for creation of the application. These separate machine learning tools can also involve different programming languages than the applications. Providing a technique to implement machine learning tools into the same integrated development environment in which applications are developed can allow for easier training of models, testing the models, and seamless integration into the applications that employ these machine learning techniques.

BRIEF SUMMARY

Certain embodiments are directed to techniques (e.g., a method, a memory or non-transitory computer readable medium storing code or instructions executable by one or more processors) for a user interface for creating machine learning models in an integrated development environment. The disclosed machine learning tool can allow for the entire flow of training and testing a model to be integrated into an application with an interactive graphical user interface. The machine learning (ML) templates can allow a developer to easily create a customized model without having to program a separate machine learning model. As examples, the training data can be obtained from storage or can be integrated from live capture/recordings of images or sound. Both stored and live data can be used for training and testing the model, all within the application.

In various embodiments, the techniques can be implemented in an application development program. The technique can allow a developer to select from one of multiple available templates. As examples, the templates can be categorized as images, text, sound, motion, and tabular data. The machine learning model can allow for classification of data and/or regression of a real valued target within a set of data.

These and other embodiments of the invention are described in detail below. For example, other embodiments are directed to systems, devices, and computer readable media associated with methods described herein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1:
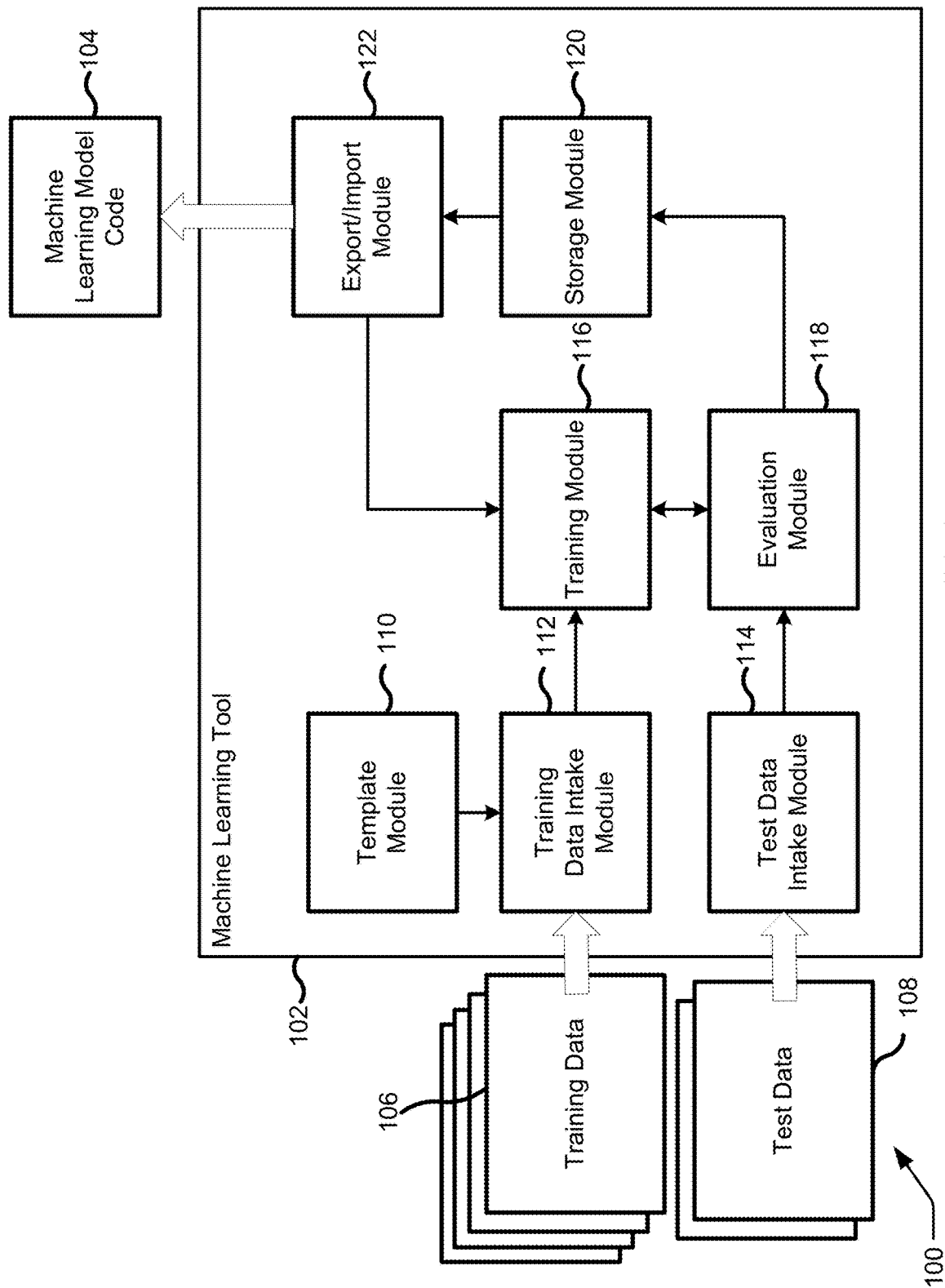
FIG. 1 illustrates a simplified, exemplary diagram of a system for generating trained machine learning models for application development.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain embodiments of the present disclosure relate to devices, computer-readable medium, and methods for creating machine learning models in an integrated development environment. The machine learning tool provides developers options regarding the type of data to selection from. Developers can select a template appropriate for the type of data used in their application.

The machine learning tool can allow a developer to easily create trained machine learning models for incorporation into applications. The machine learning tool can be application-based and can be run either as a stand-alone application or in an integrated development environment (IDE) of the operating system. In some embodiments, trained machine learning models created by the tool, e.g., provided as a stand-alone application, can be subsequently incorporated into a program that is being developed in an IDE. This enables the developer to utilize the inherent development tools that the operating system provides instead of trying to incorporate a model developed from a third party program.

This also allow for easier testing of the application in the integrated development environment.

The application, which incorporates the machine learning model, can be executed on a portable computing device such as a laptop computer or a tablet computer. The machine learning tool can be user friendly by allowing for selecting a model type and/or a model source from a graphical user interface. For example, various model types can include image analysis model, sound analysis model, text analysis model, tabular data analysis model etc. The model source can include the computer or network location of the training data. The graphical user interface can allow the developer to drag-and-drop training data into a designated area. Similarly, the developer can select evaluation or test data through an intuitive user interface. The machine learning tool can offer a graphical workflow to assist the developer through the various stages of developing and training the machine learning model. Further, the graphical user interface can provide the developer a graphical depiction of the various stages and sub-stages for generating the trained model. In some examples, the graphical user interface can display a numerical score for both the training accuracy and validation accuracy using the test data.

I. Generating a Trained Machine Learning Model

The disclosure herein describes various user friendly techniques for generating a trained machine learning model. In supervised learning, the techniques build a mathematical model from a set of data that contains both the inputs and the desired outputs. For example, if the task was determining whether an image contained a certain object, the training data for a supervised learning technique can include images with and without that object (the input), and each image would have a label (the output) designating whether it contained the object. The techniques can be used for various different types of data. The technique can include selecting a template for the model type (e.g., image analysis, text analysis, sound analysis, motion analysis, and tabular data analysis.) Next, the technique can include the intake of training data for training the model. Part of the training process can include the identification and the selection of test data to evaluate the model. After the model has been trained, the test data can be used to evaluate the model. The techniques can generate one or more scores as a result of the evaluation. The trained model can be stored and exported for use in other applications.

FIG. 1 illustrates a simplified diagram of a technique 100 for machine learning model generation. A machine learning tool 102 can be a software application executed on a computing device. The machine learning tool 102 can include presenting a plurality of graphical user interfaces to allow a developer to interact with the routines.

A. Selecting a Template

Developers can first consider if their application should incorporate machine learning. Machine learning is appropriate for performing specific tasks without using explicit instructions. Machine learning techniques accomplish these tasks by learning and using patterns found in data sets. Some typical uses for machine learning techniques include assisting manual data entry, detecting unwanted email messages, otherwise known as spam, recommending products, diagnosis techniques, customer segmentation and lifetime value prediction, predictive maintenance, financial analysis, sound analysis, image recognition, text recognition, and tabular data analysis.

If machine learning techniques are appropriate for the application, a developer can use the machine learning tool 102 to generate a trained machine learning model 104. The machine learning tool 102 can present a template chooser that presents options for different categories of data that the developer can choose from. The categories can include images, text, sound, motion, and a generic category for tabular data. Each category can further have subcategories. For example, the image analysis can have subcategories of image classification and object detection.

The machine learning tool 102 can provide a template module 110. The template module 110 can provide a graphical user interface to allow a developer to select a template from a plurality of templates. The templates can be organized by category and subcategory, corresponding to different model types. Such a graphical user interface allows the developer to select from different graphical representations of the aforementioned categories. The graphical user interface also provides a description of the particular template. As examples, a developer can select a template by clicking on the description with a pointing device or selecting on a touch screen. After a template is selected, the machine learning tool 102 can open a project view that can guide the developer through the steps of building the trained model. The phases for generating the trained machine learning model can include problem development, data collection, training the model, and deploying the trained model.

Figure 2:
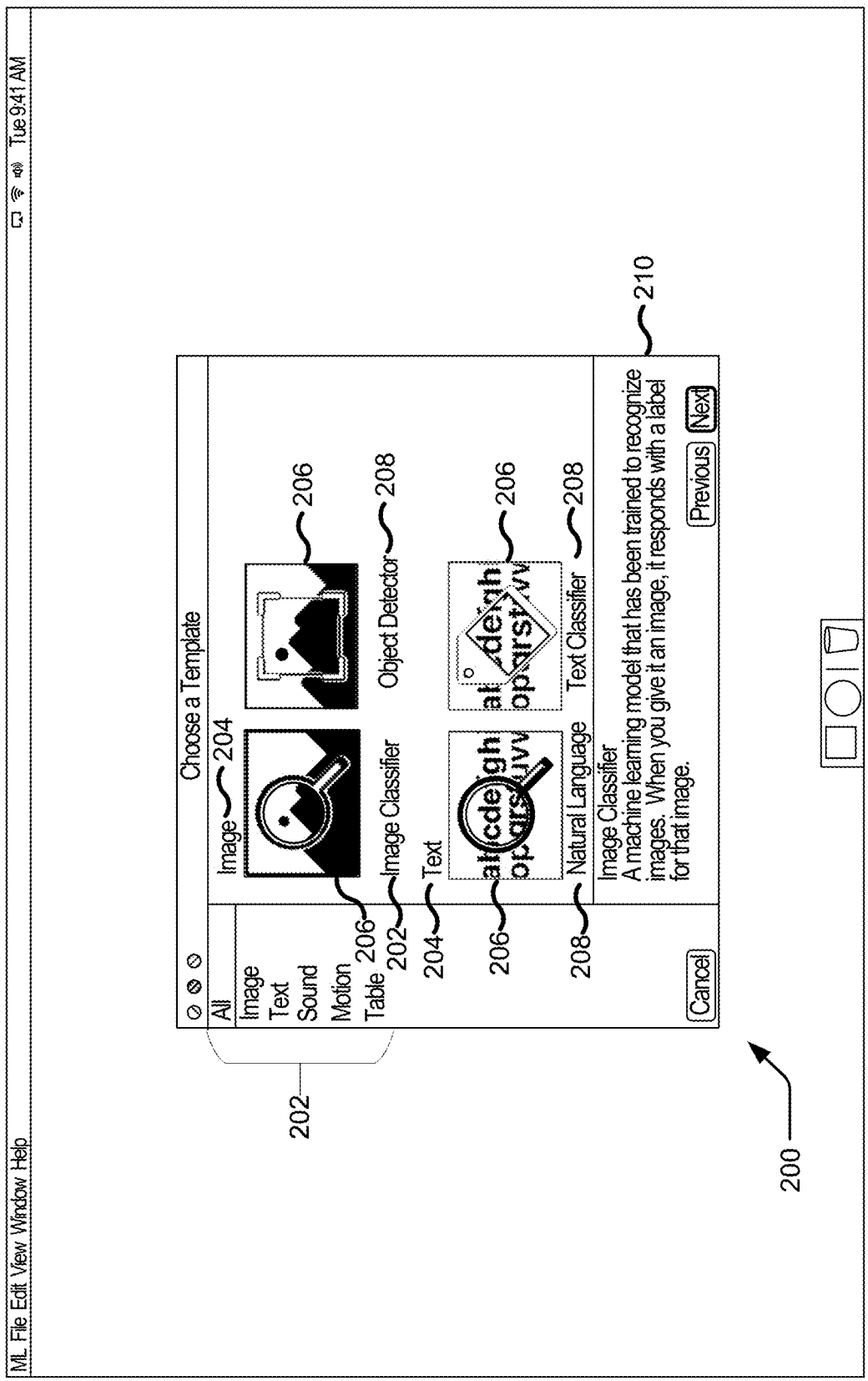
FIG. 2 illustrates an exemplary graphical user interface for selecting a template for generating a trained machine learning model.

FIG. 2 illustrates an exemplary graphical user interface 200 for selecting a template for generating a trained machine learning model. The template GUI 200 depicts a template list 202 that can include Image, Text, Sound, Motion, and Table templates, though in other embodiments, other templates can be provided. A developer can also display "All", as shown in FIG. 2, which displays all templates in a scrollable presentation. The category 204 can be displayed above an icon 206 for the templates. As shown in FIG. 2, the GUI 200 shows two templates for the Image category 204. FIG. 2 depicts an icon 206 and a label 208 for each of the templates in the category 204. For example, FIG. 2 depicts an icon 206 and label 208 for "Image Classifier" and "Object Detector" templates. FIG. 2 shows the image classifier template selected and a text description box 210 provides additional information for that template.

A brief description of the different classification types of models follows.

1. Image Analysis Templates

In some embodiments, the image analysis classification can have two different types of models. One model type is an image classification model that can be trained to classify objects depicted in visual images. A second type of model is an object detection model. The object detection model allows for detection of specific objects, animals, or persons in an image. In a non-limiting example, a developer may want to create an flower image classification model. The flower classification model can analyze images of flowers to refine a core image classification model to detect specific flowers. For example, the flower classification model can properly classify images of roses, daffodils, sunflowers, etc. from an image captured by a user's smartphone.

Image classification is the problem of identifying what label out of a set of categories to apply to an image. A first step is to collect training data 106. The training data 106 can include a plurality of image files. The image files can be multiple image file formats. The image file formats can include Joint Photographic Experts Group (JPEG), Exchangeable image file format (Exif), Tagged Image File Format (TIFF), Graphics Interchange Format (GIF), Windows bitmap (BMP), Portable Network Graphics (PNG), and Better Portable Graphics (BPG). Other formats exist and can be used. A developer can gather many varied types of images that reflect the true data that the classifier can end up seeing and then label them. Ideally, the data should reflect the real usage of the application. So, for example, if a developer is creating a custom image classifier that is going to be used by users on their smartphone, the developer should collect pictures from a smartphone and perhaps less screenshots.

Image classification models can provide initial categorical labels providing insights about the image (e.g., whether the image was taken indoors or outdoors). The image classification model can further detect the room (e.g., a kitchen) that the image was captured. Object detection can add bounding boxes around objects in the image an suggest labels for the objects in the bounding boxes.

The machine learning tool 102 also incorporates a live mode. Using the live mode, a developer can take an image from a smartphone or other electronic device and test the accuracy of the image classifier during development.

2. Text Analysis Templates

The machine learning tool 102 can employ at least two types of models for text analysis. One type of model is natural language processing which helps process and understand meaning from human language text. All of the machine learning in natural language processing that is powered in Natural Language is done on device to protect user's privacy. Text Analysis models can include text classification and word tagging. A text classifier takes a chunk of text, e.g., a sentence or a paragraph or an entire document, and applies a label to it. Text classification can be used for determining sentiment analysis, spam analysis, and topic analysis.

In a test classification workflow, the training data 106 can include raw text files organized in folders whose truth label is the name of the folder. Alternately, the training data can use comma-separated values in which the text and truth labels are separated by a comma. JavaScript formatting is also supported.

In a text classifier, a language identifier can identify the native language of the text. The language identifier can identify a dominant language of a text file. A Language Hypotheses API can specify the maximum number of languages contained in a text file and calculate the associated probability that the text is one of the languages. The text can then be converted into tokens that can be further changed into featured values. The core model for a text classifier can then be trained using the training data by comparing the output with the truth data.

For example, a text classifier can be used to evaluate a number of reviews automatically. So, for text classification, a developer can create an application to understand user reviews and desires to know automatically whether a given review is a positive review or a negative review, or somewhere in between. Such a process can be referred to as sentiment classification. Another example use for a text classifier is categorizing articles by using article summaries or maybe even just article headlines. Another potential implementation is an automated travel agent that can determine the category of topic that a client is asking about. The text classifier can determine if a client is interested in hotels or restaurants or flights.

A word tagger can take a sentence considered as a sequence of words, and then apply labels to each work in a sentence in context. A word tagger can generate a custom name tagger for automatic name recognition of custom names such as product names. A word tagger can divide sentence portions of text, either words in sequence or chunks of text in the text classifier. For example, the word tagger can label the word as a person, an organizational entity, a slang word, etc. The word tagger parses free form text and explains the structure of the word.

All of the machine learning that is done for natural language processing can be performed on the device to protect a user's privacy.

Other features of text analysis include auto speech tagging and named entity recognition. The named entity recognition API can return search results that are relevant to a named entity in the text. Based on what a user has been browsing in web search tools, the named entity recognition can suggest names and locations relevant to the browsing history, thereby enhancing the search experience in the application.

3. Sound Analysis Templates

The machine learning tool 102 can employ one or more sound analysis templates. A sound classifier could be used to identify specific instruments such as cowbell, cymbals, drums, a guitar, etc. Laughter and silence can also be classified. The sound classifier can be trained using multiple sound clips. Once trained the sound classifier can analyze a sample sound clip and determine a classification for sounds at different windows of time.

The sound classifier can be incorporated with other features (e.g., a live record feature) which would enable live listening and analysis of the sound in near real time. In this live analysis mode, the machine learning tool 102 can listen to a microphone on the computing device locally or remotely by using sound from the microphone input from a companion device like a smartphone.

4. Motion Analysis Templates

The machine learning tool 102 can employ one or more motion analysis templates. A motion classifier can identify specific motions captured from one or more sensors, e.g., on a smartphone or wearable device (e.g. an accelerometer). For example, a motion analysis template can be trained on proper form for forehand and backhand swings in tennis. The machine learning tool 102 enables a developer to integrate the motion analysis template into an application for improving a tennis swing. Similar routines can be written to identify specific exercises. The motion analysis model can be trained to identify specific exercises and capture the number of repetitions for each exercise.

5. Tabular Data Analysis Templates

The machine learning tool 102 can employ one or more templates for analyzing tabular data. Tabular data can be structured data that is organized in a table format. An example can be home sales information for a given area. The home sales information can include the features of the home such as the number of bedrooms, the number of bathrooms, the total square footage of the home, proximity to schools, and the sales price of the home. A developer may want to use this information to predict sales price as a function of one or more of these features. The machine learning tool 102 can import data as a comma-separated values (CSV) file or JavaScript formats. The templates can allow for easy calculations such as price per square foot. The templates can also allow for easy filtering of the data such as filtering out houses with less than a certain number of bedrooms.

B. Intake of Training Data for Generating a Machine Learning Model

Returning to FIG. 1, the machine learning tool 102 can allow a developer to input training data 106. The training data 106 can include multiple files stored in a memory of a computing device or on a network. The training module 116 can use the training data 106 to modify the selected template parameters to result in a trained model capable of identifying or classifying an image, a sound, motion, or tabular data based on the selected template and training data. The training data 106 can include metadata that identifies one or more characteristics (e.g., image, sound, or sensor data features) of the file. The machine learning tool 102 supports a large number of algorithms such as Boosted Tree Regression, Random Forest, etc. All of these algorithms are represented by their class. In order to train a selected model, the developer will only have to write one line of code identifying is the target and the source of data. So in this case, the developer can select Linear Regression or Regularized Linear Regression, and the developer would identify the house data and the column is price.

The training data 106 can be structured data files of varying formats. The data files can be associated with metadata files. In the case of structure data files, file folders can provide information as to the files contained within the file. For example, for a flower classifier, a file containing images of roses can be labeled "roses." The machine learning tool 102 can identify the name of the folder and associate the features of the images contained in the folder with roses. In the case of a sound analysis, the folder can contain sound clips of a guitar. The folder can be labeled "guitar" and the machine learning tool 102 can associate the features of the sound clips contained within the folder with guitars.

The training data 106 can be contained in a memory of the computing device that the machine learning tool 102 is being executed on. The training data 106 can also be located in a storage device connected to the computing device. Alternately, the training data 106 can be stored in a database provided from a cloud based service.

In various embodiments, the data can be collected and labelled as a dictionary with the string label corresponding to arrays of images. Data sets can also be organized in hierarchical directory structures such that the label is the name of the folder that contains all images within it. There can also be other data sources such as single folders that contain labeled filenames.

The machine learning tool 102 can include a training data intake module 112. The training data intake module can include an application programming interface (API) to extract the training data 106 and associated data structures from a memory of a computing device. The training data 106 and associated data structures can be imported from a database server. The database server can be a cloud-based server that can be accessed through a network (e.g., the Internet).

The machine learning tool 102 can provide the developer with errors and warnings at various trigger points in the process. For example, when a developer drags and drops training data 106, the technique can conduct data analysis on the training data 106 and can display errors and warnings on the user interface. At each stage of the process, the machine learning tool 102 can identify and display errors and warnings to the developer. Some errors and warning can send the developer back to a previous stage to correct. In addition, the machine learning tool 102 also has a completely separate view to provide insights to the data, independent of the specific task. For example, this separate view can inform the developer by plotting a distribution of a labels of possible classes. In the separate view, a histogram can depict a number of annotations for each of the different classes of a classifier for the identified data source. The detailed view can inform the developer if several images are duplicates or are very similar. This allows the developer to understand the richness of the data.

Figure 3:
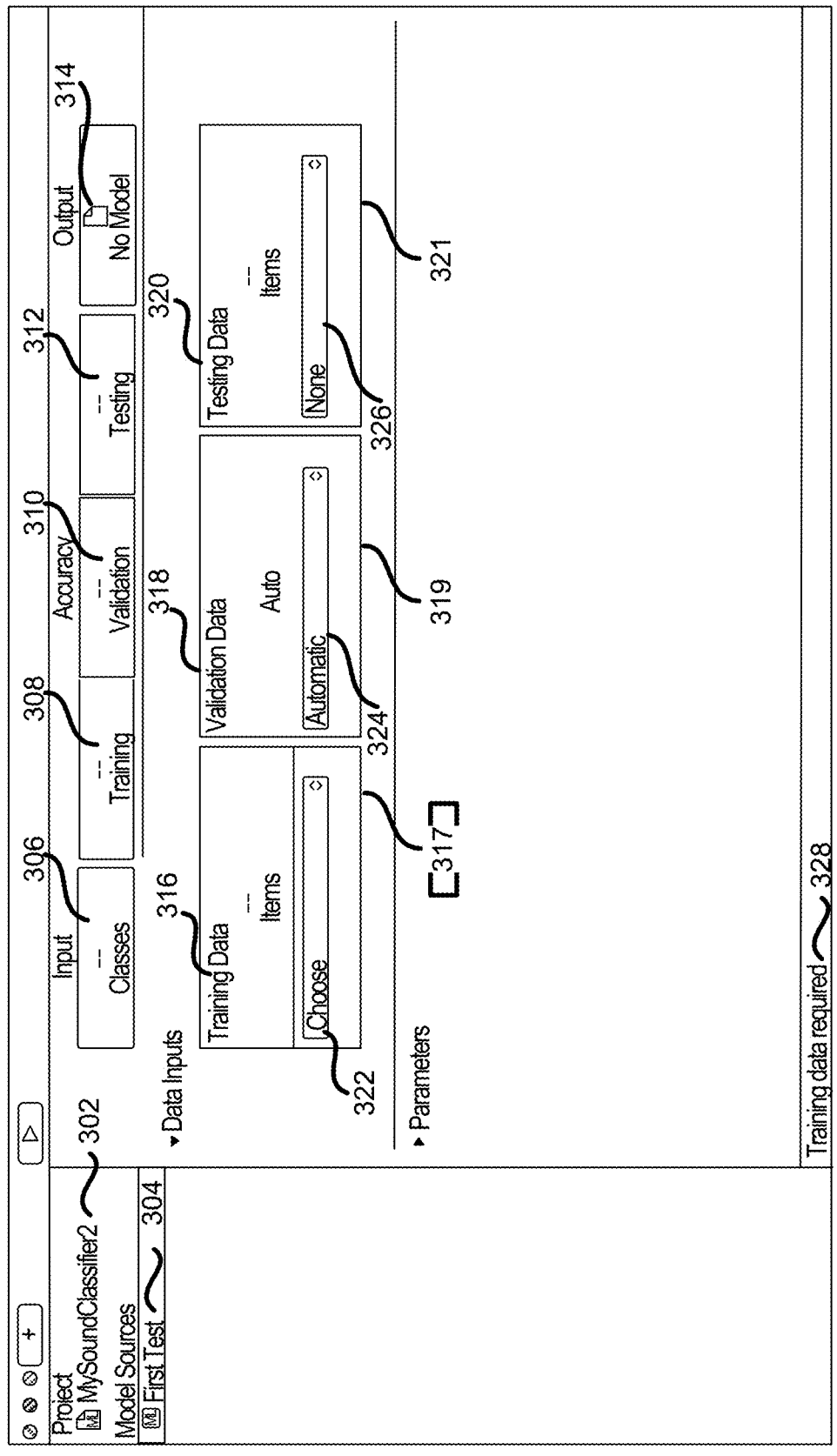
FIG. 3 illustrates an exemplary graphical user interface for selecting training data for a sound classifier.

Turning to FIG. 3 illustrates a input graphical user interface 300 for selecting training data for a sound classifier. The input graphical user interface 300 lists the name 302 of the project file and the model template 304. The machine learning tool 102, shown in FIG. 1, can allow a developer to select a model template from various model sources that can be further trained using the training data. As shown in FIG. 3, the name 302 of the project file is "MySoundClassifier2" and the model template 304 is "First Test." In the input box 306, the number of detected classes for the "First Test" model template can be displayed. The training box 308 can indicate the accuracy of the trained model on the selected training data. The validation box 310 can show the accuracy of the trained model on the validation data. The testing box 312 can show the accuracy of the trained model on the testing data. The output box 314 can display the name of the output file for the trained model. In FIG. 3, the output box 314 indicates that no model has been trained.

The input graphical user interface 300 allows for developer selection of a model template 304, training data 316, validation data 318, and testing data 320. The graphical user interface 300 provides a first drop-down menu 322 to allow a developer to select a location of training data 316. The training data 316 can be uploaded from a file in a memory of the computing device. Alternately, the training data 316 can also be dragged from another file on the computing device and dropped onto the training data box 317. The developer can select one or more files for use as validation data 318 and testing data 320. In some embodiments, the developer can select the specific classes of data to be used as training data 316.

The input graphical user interface 300 provides a second drop-down menu 324 for selection of validation data 318. The validation data 318 can be uploaded from a file in a memory of the computing device. Alternately, the validation data 318 can be dragged and dropped onto the validation data box 319. The developer can select one or more files for use as validation data 318. The developer can select "Automatic" in which the machine learning tool 102 holds back a preselected amount of training data 316 (e.g., 10% of training data 316) as validation data 318.

The input graphical user interface 300 provides a third drop-down menu 326 for testing data 320. After the model has been trained and validation, a developer can upload addition testing data 320 to test the classification of the trained model. The testing data 320 can be uploaded from a file in a memory of the computing device. Alternately, the testing data 320 can be dragged and dropped onto the testing data box 321.

The input graphical user interface 300 provides a status box 328 which indicates "Training data required." This prompts the developer to identify training data 316 using the interface.

Figure 4:
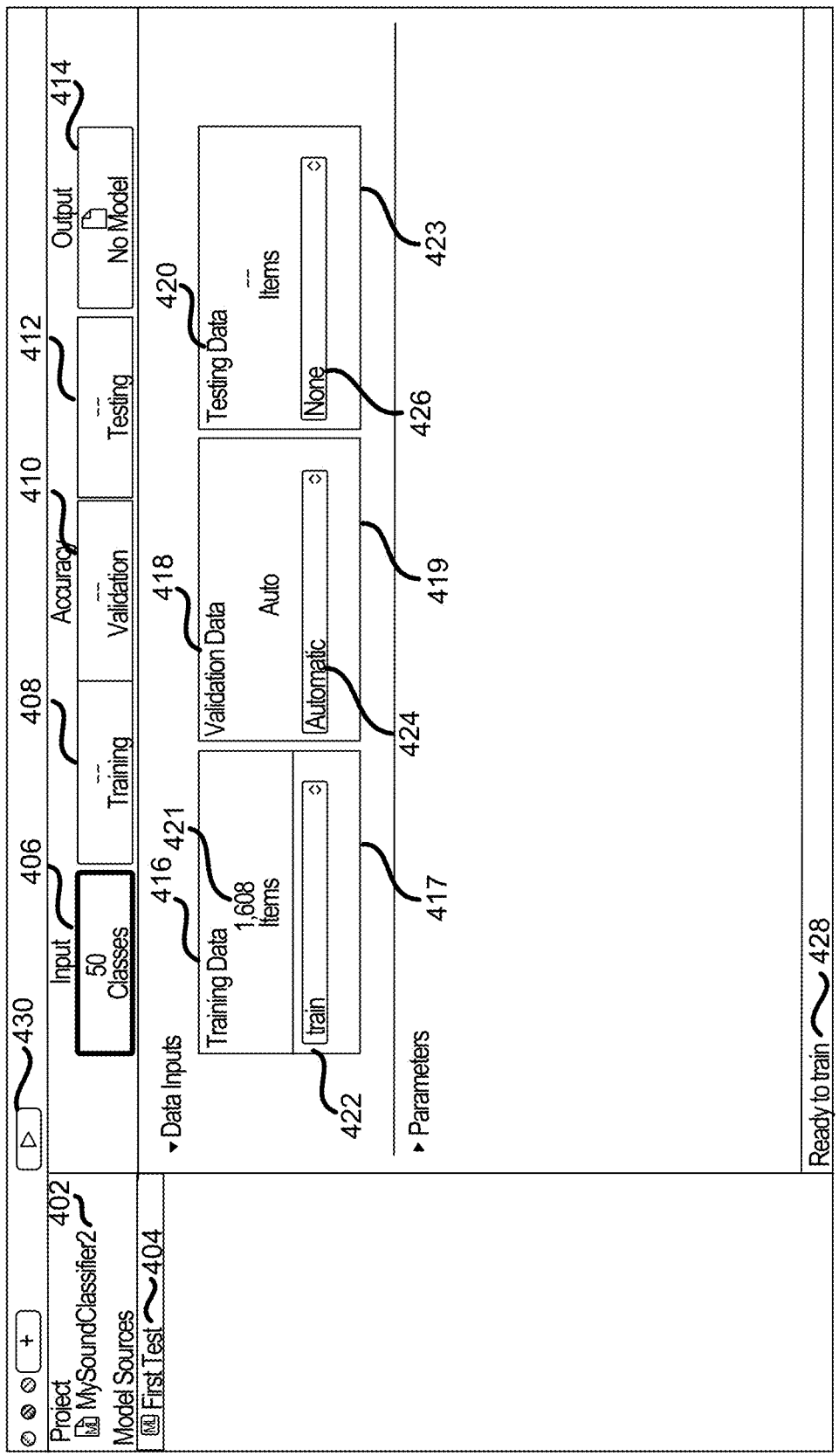
FIG. 4 illustrates an exemplary graphical user interface for dragging in training data for a sound classifier.

FIG. 4 illustrates an exemplary graphical user interface 400 for selecting training data for a sound classifier. FIG. 4 is a follow-on to the graphical user interface 300 depicted in FIG. 3. The graphical user interface 400 lists the name 402 of the project file and the model template 404. As shown in FIG. 4, the name 402 of the project file is "MySoundClassifier2" and the model template 404 is "First Test." In the input box 406, the number of detected classes in the training data 416 is displayed. The training box 408 shows the accuracy of the model on the selected training data. The validation box 410 shows the accuracy of the model on the validation data. The testing box 412 shows the accuracy of the trained model on the testing data. The output box 414 shows the name of the output file. In FIG. 4, the output box 414 indicates that no model has been trained.

In FIG. 4, the graphical user interface 400 shows that the training data 416 has been added. The machine language tool 102 has identified 1,608 items in the training data 416. The input box 404 indicates that the machine language tool 102 has identified 50 classes of data in the training data 416.

The graphical user interface 400 allows for developer selection of training data 416, validation data 418, and testing data 420. The graphical user interface 400 provides a first drop-down menu 422 for selection of a location of training data 416. The training data 416 can be uploaded from a file in a memory of the computing device. Alternately, the training data 416 can be dragged and dropped onto the training data box 417. The developer can select one or more files for use as training data 416. In some embodiments, the developer can select the specific classes of data to be used as training data 416. Upon selection of training data 416, the graphical user interface can display the number of items 421 contained in the training data 416.

The graphical user interface 400 provides a second drop-down menu 424 for selection of validation data 418. The validation data 418 can be uploaded from a file in a memory of the computing device. Alternately, the validation data 418 can be dragged and dropped onto the validation data box 419. The developer can select one or more files for use as validation data 418. The developer can also select "Automatic" from the second drop-down menu 424 in which the machine learning tool 102 holds back a preselected amount of training data 416 as validation data 418.

The graphical user interface 400 provided a third drop-down menu 420 for testing data 420. After the model has been trained and validated, a developer can upload addition testing data 420 to test the classification of the trained model. The testing data 420 can be uploaded from a file in a memory of the computing device. Alternately, the testing data 420 can be dragged and dropped onto the testing data box 423.

The graphical user interface 400 provides a status box 428 which indicates that the model is "Ready to Train." The "Ready to Train" notification prompts the developer to execute the training process by selecting the play button 430.

Returning to FIG. 1, the training data 106 can be stored in a file on the desktop of the integrated development environment. The developer can simply drag the training data folders to the designated area. The machine learning tool 102 can determine how many categories by the number of folders for the training data and provide some high level summaries. For example, in the flower classifier example, the machine learning tool 102 can understand that the developer is generating a 17 class classifier with 2000 training images.

C. Training a Machine Learning Model

As examples, the following machine learning models can be employed: Linear Regression, Logistic Regression, Decision Tree, Support Vector Machine (SVM), Naive Bayes, k-Nearest Neighbor (kNN), K-Means Clustering, Random Forest, Dimensionality Reduction Algorithms, Gradient Boosting algorithms (GBM) (e.g., XGBoost, LightGBM, and CatBoost.) Various techniques can employ one or more algorithms to train the model for the desired purpose to the target accuracy, such as using gradient method's with back-propagation, ensemble learning, variational Bayesian methods, and adaboost.

After the training data 106 is imported, the model can be trained. The developer can begin the training by selecting a play button 430, as shown in FIG. 4. The training module 116 uses the training data 106 to modify the model to predict desired outcomes. The training data 106 can extract one or more features from each the training data assets. The training module 116 can associate the one or more features of the training data assets with labels provided by the associated data structures. The labels can also take the form of metadata associated with the training data 106. The training module 116 analyzes hundreds, thousands, and even millions of data elements to generate refine the machine learning (ML) model into a trained model. Ideally, after training, the model can predict a desired output when presented new, unseen data (i.e., the test data 108).

The training module 116 can incorporate autocomplete features for incorporation of training data 106. The training module 116 allows for identification of training data in the form of dictionary of labels and arrays of data, a data source, or specify model training parameters. A graphical user interface for the training module can include a console that informs the developer that the training module 116 is extracting features and the number of iterations the training module is running through. The graphical user interface can provide a quick-look to inform the developer the how many examples the training module 116 has evaluated and the number of classes evaluated.

Figure 5:
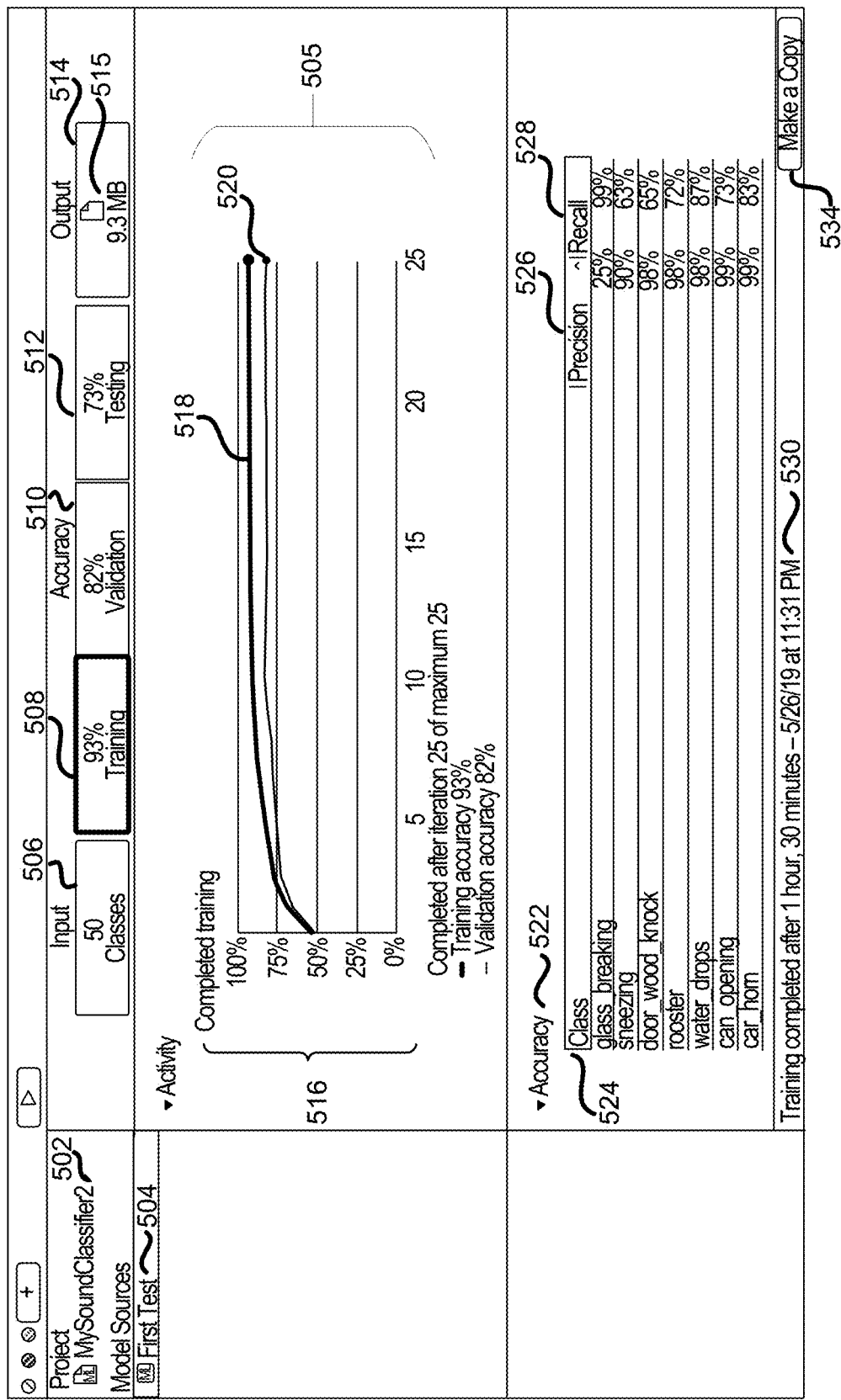
FIG. 5 illustrates an exemplary graphical user interface for training a machine learning model.

FIG. 5 illustrates a training graphical user interface 500 for generating a machine learning model. FIG. 5 is a follow-on to the graphical user interface 400 depicted in FIG. 4. The graphical user interface 500 lists the name 502 of the project file and the model template 504. As shown in FIG. 5 the name 502 of the project file is "MySoundClassifier" and the model template 504 is identified as "First Test." The graphical user interface 500 depicts a progress indicator 516 that shows the progress for the machine learning techniques. The input box 506 displays that 50 classes are detected in the training data. The training box 508 displays that the current training accuracy of the model is 93%. The validation box 510 shows the accuracy of the trained model on the validation data is 82%. The testing box 512 shows the accuracy of the trained model on the testing data is 73%. The output box 514 shows an icon 516 and the size (in bytes) of the output file. The output file depicted in FIG. 5 is 9.3 megabytes (MB).

The training graphical user interface 500 depicts a line plot graph of a training accuracy line 518 and the validation accuracy line 520 over the number of iterations for the model. The accuracy block 522 can provide the developer further insights into the trained model's accuracy for different classes. For example, the training graphical user interface 500 can depict the precision 526 and recall 528 for each class 524 of data. Precision means the percentage of the results which are relevant. Precision can be calculated as the true positive results divided by actual results (true positive results plus false positive results). Recall refers to the percentage of the total relevant results correctly calculated by the trained model. Recall can be calculated as the true positive divided by predicted results or (true positive plus false negative). The accuracy of the trained model can be calculated as true positive plus true negative divided by total results. The trained model depicted in FIG. 5 is a sound classifier, so the model indicates various classes of sounds (i.e., glass breaking, sneezing, rooster, etc.).

The graphical user interface 500 provides a status box 528 which indicates "Training completed after 1 hour, 30 minutes on 5/26/2019 at 11:31 PM." The developer can make a copy of the results by selecting the Make a Copy button 534. The developer can also drag and drop the executable output file icon 515 into a file directory on the computing device.

Figure 6:
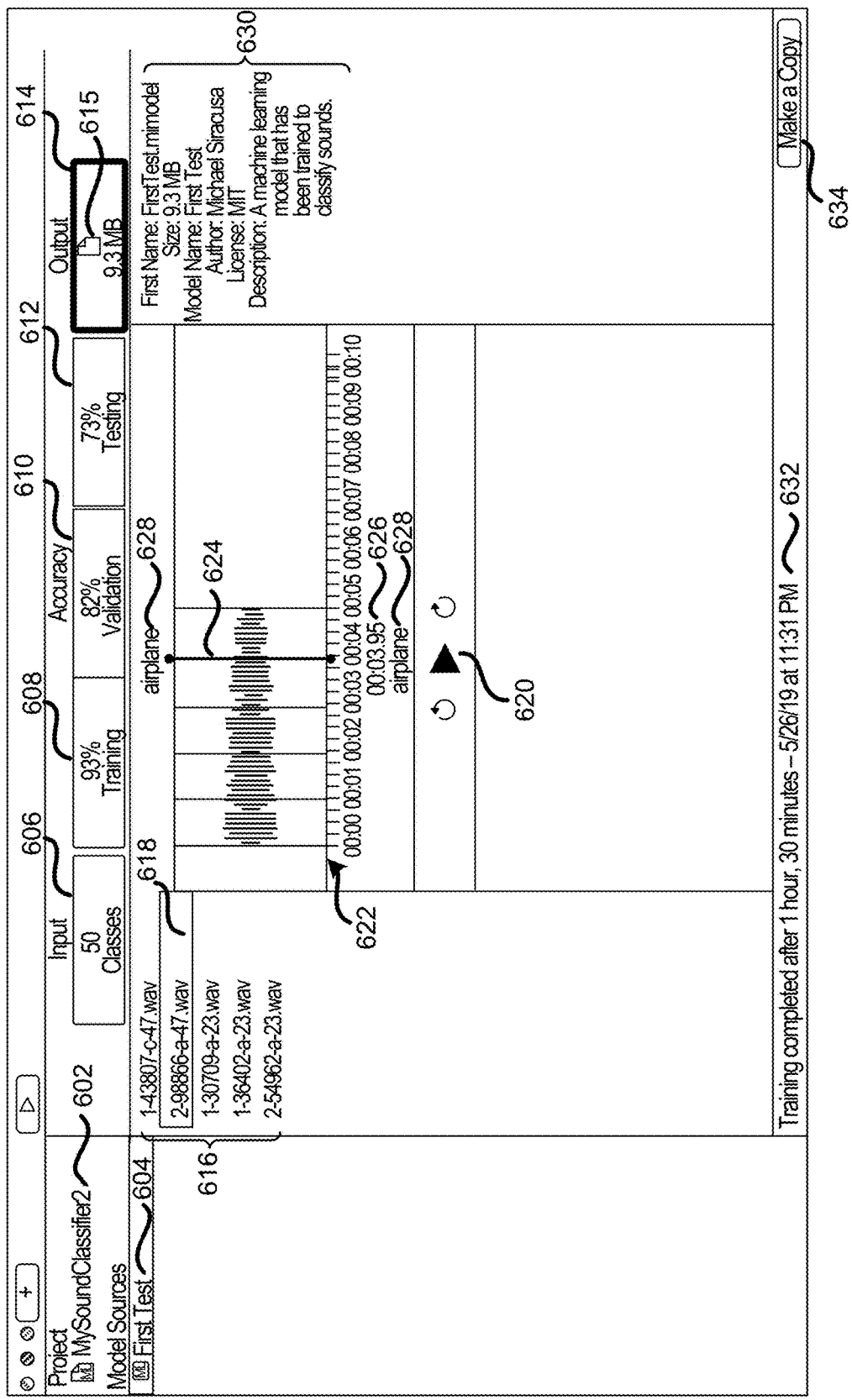
FIG. 6 illustrates an exemplary graphical user interface for an output of a machine learning model, specifically a sound classifier.

FIG. 6 illustrates an output graphical user interface 600 for an output of a machine learning model, specifically a sound classifier. FIG. 6 is a follow-on to the training graphical user interface 500 depicted in FIG. 5. The output graphical user interface 600 can be selected by selecting the output file box 614. The output graphical user interface 600 lists the name 602 of the project file and the model template 604. As shown in FIG. 6 the name 602 of the project file is "MySoundClassifier" and the model template 604 is "First Test." The input box 606 displays that 50 classes are detected in the training data. The training box 608 displays that the current training accuracy of the trained model is 93%. The validation box 610 shows the accuracy of the trained model on the validation data is 82%. The testing box 612 shows the accuracy of the model on the testing data is 73%. The output box 614 shows the icon 615 and the size (in bytes) of the output file.

The output graphical user interface 600 allows for selection of one of several test files 616. An audio file 618 labeled "2-98866-A-47.wav" has been selected in FIG. 6. The audio file 618 can be played by selecting the play button 620. The output graphical user interface 600 provides a graphical depiction 622 of the sound wave. The graphical depiction 622 displays a bar 624 showing the current position of the execution of the audio file 618. The graphical depiction 622 displays a current time 626 and a classification label 628 above and below the graphical depiction 622. The portion of the audio file 618 in FIG. 6 has received a classification label 628 of an "airplane." The output graphical user interface 600 provides a details section 630. For example, the details section 630 can include: Full file name of the output file, the size in megabytes of the file, the model name, the author of the file, the license identifier, and the description of the file.

The output graphical user interface 600 provides a status box 632, which indicates "Training completed after 1 hour, 30 minutes on 5/26/2019 at 11:31 PM." The developer can make a copy of the results by selecting the Make a Copy button 634. The developer can also drag and drop the executable output file 614 into a file directory on the computing device.

Figure 7:
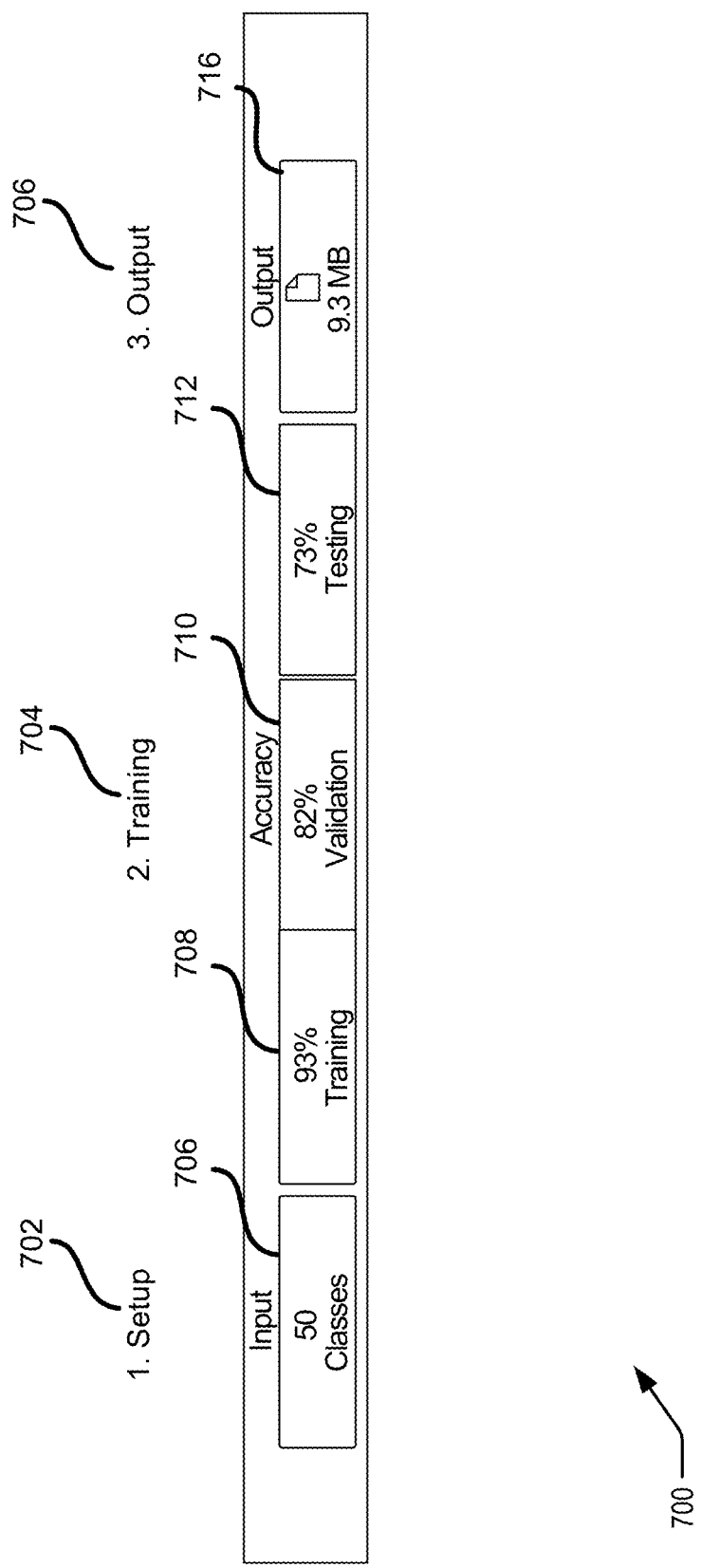
FIG. 7 illustrates an exemplary graphical user interface for a progress bar for techniques for generating a trained machine learning model.

FIG. 7 illustrates a progress bar 700 for techniques for generating a trained machine learning model. The progress bar 700 is divided into three phases Setup 702, Training 704, and Output 706. The progress bar 700 depicts an input box 708 displays that 50 classes are detected in the training data. The training box 710 displays that the current training accuracy of the trained model is 93%. The validation box 712 shows the accuracy of the trained model on the validation data is 82%. The testing box 714 shows the accuracy of the trained model on the testing data is 73%. The output box 716 shows the name and the size (in bytes) of the output file.

Figure 8:
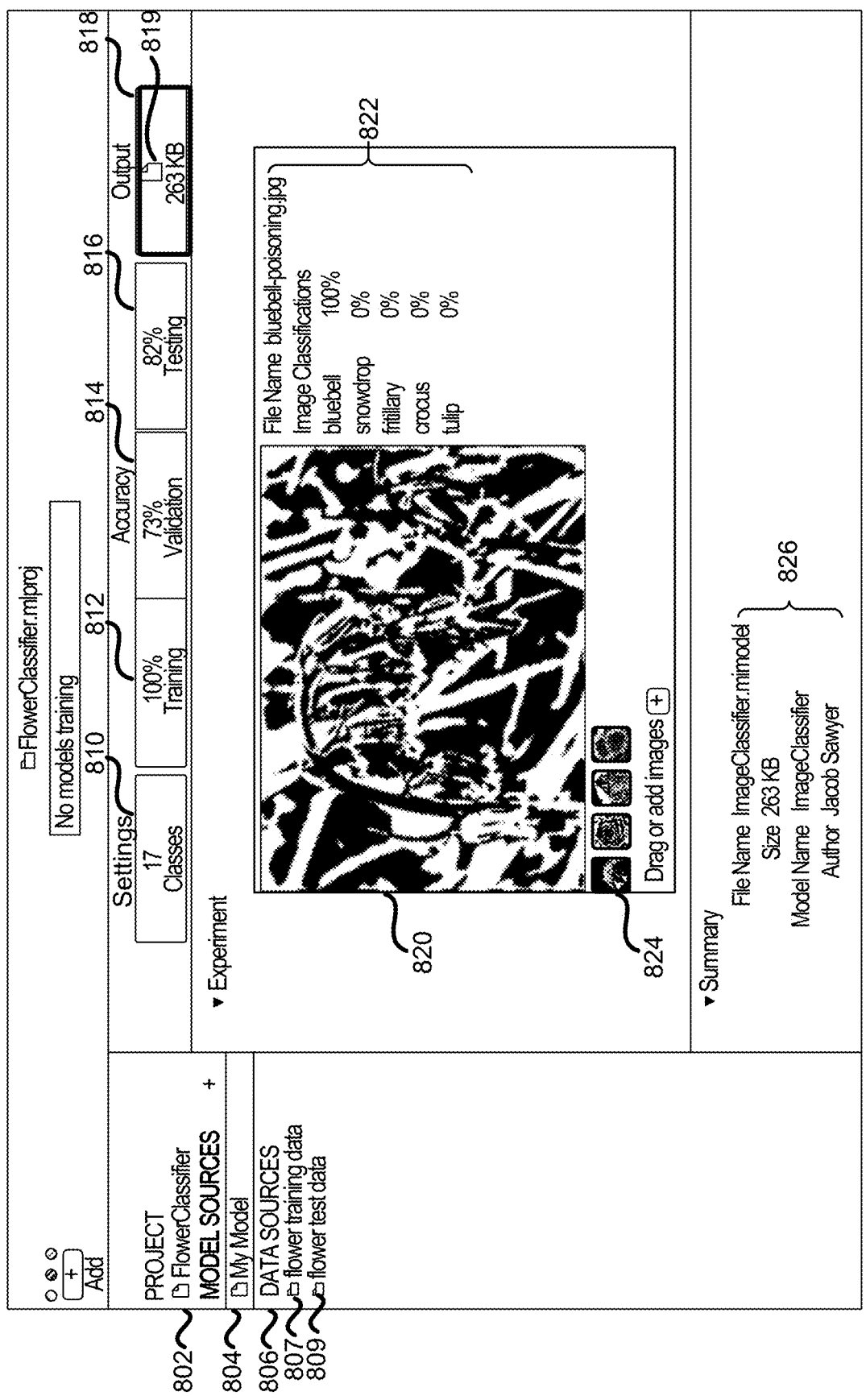
FIG. 8 illustrates an exemplary graphical user interface for an output of a machine learning model, specifically an image classifier.

FIG. 8 illustrates an output graphical user interface 800 for an output of a machine learning model, specifically an image classifier. The output graphical user interface 800 can be selected by selecting the output file 818. The output graphical user interface 800 lists the name 802 of the project file and the model template 804. As shown in FIG. 8, the name 802 of the project file is "FlowerClassifier" and the model template 804 is "My Model." The output graphical user interface 800 displays two data sources 806, specifically flower training data 807 and flower test data 809. The settings box 810 displays that 17 classes are detected in the training data. The training box 812 displays that the current training accuracy of the trained model is 100%. The validation box 814 shows the accuracy of the trained model on the validation data is 73%. The testing box 816 shows the accuracy of the trained model on the testing data is 82%. The output box 818 shows the icon 819 and the size (in bytes) of the output file.

FIG. 8 depicts a test image 820 displayed. An information box 822 for the test image 820 can also be displayed. The information box 822 can present the File name for the test image and the percentage that the trained model depicted the test image 820 as a particular class. For example, for the bluebell image depicted in FIG. 8, the information box 822 indicates that the trained model classifies the image 100% as a bluebell, and 0% as a snowdrop, fritillary, crocus, and tulip. The output graphical user interface 800 provided a drag and drop interface 824 for evaluating other test images. The output graphical user interface 800 also provides a summary details 826 for the image classifier being executed.

In some embodiments, transfer learning techniques can be employed. Transfer learning is a machine learning method where a trained model developed for a task is reused as the starting point for a model on a second task. Transfer learning differs from traditional machine learning in that it is the use of pre-trained models that have been used for another task to jump start the development process on a new task or problem. The benefits of transfer learning are that it can speed up the time it takes to develop and train a model by reusing these pieces or modules of already developed models. This helps speed up the model training process and accelerate results.

Models that have already been trained on large data sets can often lend parts of their code to other models. Modules can be used to build a new model on a new data set. This is another method for speeding up the model building process and gaining efficiencies in your Machine Learning workflow.

Transfer learning techniques can be applied on top of this model that already exists in the machine learning tool. Using these techniques, the last few layers of the model can be retrained to the specific data so the system no longer need millions of data sets to train. In addition to reducing the time required for training, this can result in much smaller models going from hundreds of megabytes down to just a few megabytes for thousands of images or even kilobytes.

Returning to FIG. 1, a user interface of the machine learning tool 102 can allow a developer to drag-and-drop addition training data into the model and observe the builder in a live view. The training module 116 can employ a graphics processing unit of the computing system to perform the analysis. The training module 116 can provide progress indications while training even inside a training stage if there are multiple sub-stages. The progress indications can be graphical representations or textual information to inform the developer the progress of training. As the training progresses, the machine learning tool 102 can calculate and display the accuracy in training the model. The machine learning tool can update the accuracy dynamically as the training progresses. The machine learning tool can even differentiate the accuracy for the different training classes. For example, in the flower classifier, the machine learning tool 102 can differentiate the accuracy for roses as compared to the accuracy for carnations. This can provide the developer insights into the model.

Previous machine learning tools did not save information at the various steps in generating the trained model. Therefore, the developer could not go back to see what was done to create the machine learning model. The disclosed techniques allow a developer to see how the trained model was developed to make it easier to make modifications. By saving the information to include accuracy and validation setting, a developer can make changes to the training data to test the effects on the model generation. In addition, previous models did not provide for live interactions with mobile devices. By allowing a developer to use data from mobile devices (e.g., a user's smartphone), this allows for testing the machine learning tool by providing end-users interaction with the model before the application into which the machine language model is incorporated is even completed.

The training module 116 can detect errors during training of the data. In some cases the data may be in the incorrect format. In some cases, there can be insufficient data for one or more classes of the data. The training module 116 can display warning and errors. An example warning may be due to data imbalance. For example, there may be 100 more images of roses than of daisies. The errors and warnings can even be represented graphically. The training module 116 can provide developers suggestions to fix the errors and warning. In some embodiments, the training module 116 may automatically correct the errors (e.g., rebalance the classes).

One way a developer can influence the model development is by balancing the data. One way to balance the data can be by removing duplicates. Another way the developer can modify the model is by adding noise to the images if the images are very clean. The developer can also modify the orientation of the images.

The training module 116 inserts check points at various points during training the model. The use of check points allows the developer to go back to a previous versions of the model. Therefore, if a developer finds that inclusion of a new batch of training data adversely affects the trained model, the developer can easily return to a version of the trained model at a previous check point that occurred prior to inclusion of the new batch of training data. This saves the developers time during the training process because the developer can easily see not only the effects of the new data but can return to an earlier version of the model to modify the training data to improve the trained model.

The training module 116 can also be scheduled when the resources of the computing device are available (e.g., after hours or at night). This allows the developer to readily use the resources of the computing device for present computing tasks and runs the intensive processing for when demand for other tasks is low.

D. Selecting Test Data to Evaluate Model

The machine learning tool 102 can allow a developer to input test data 108. The test data 108 is data that the machine learning tool 102 has not used for training and has been previously unseen by the machine learning tool 102.

The test data 108 can include one or more metadata files associated with the test data 108. The metadata files can identify a true identification of the file. For a classification model, the test data 108 should include files for several different classifications. For example, for a flower image classifier, the test data 108 should include multiple images of different flowers (e.g., roses, carnations, daffodils, etc.). Each of the images would have metadata that provides a true identification of each of the images of the test data 108.

The machine learning tool 102 can include a test data intake module 114. The test data intake module 114 can include an application programming interface (API) to extract the test data 108 and associated data structures from a memory of a computing device. The test data 108 and associated data structures can be imported from a database server. The database server can be a cloud-based server that can be accessed through a network (e.g., the Internet). In some embodiments, the test data intake module 114 can be the same module as the training data intake module 112.

E. Evaluate Trained Model Using Test Data

The machine learning tool 102 can include an evaluation module 118 to evaluate the model using the test data 108. The evaluation module 118 can evaluate the trained model by analyzing the features of the previously unseen test data 108. The test data 108 can include metadata that can provides the true identity of the test data. In this way the machine learning tool 102 can compare the output of the trained model with the truth data. In this way, the machine learning tool 102 can calculate an accuracy of the trained model. A graphical user interface can display a percentage accuracy of the model. For example, for an flower classifier the test data 108 can contain multiple images of different types of flowers. The evaluation module 118 can test the accuracy of the flower classifier model by comparing the output of the flower classifier with the ground truth. The machine learning tool 102 allows for the categories to be sorted by accuracy.

Another feature of the machine learning tool 102 is that it allows a developer to drag images into the trained model and analyze the output. FIG. 8 depicts a drag and drop interface 824 that allows a user to drag images to test the trained model. Other models can provide similar interfaces to test other types of files (e.g., a sound classifier can allow for dragging a sound clip into the drag and drop interface to classify the sound file). This provides the developer details on a single prediction of that model. Developers may want to use images from a camera on an electronic device (e.g., a smartphone). The machine learning tool 102, provides a live mode where the developer can switch into a mode that allows for capturing images from the smartphone and test the image. Previously, developers would have to write an application to play it on a smartphone with the model and then use the application on the smartphone and write the code to display some graphic detailed information on there. The machine learning model 102 is app-based and allows for easy testing of the model on the smartphone during development, without writing a single line of code for the application.

F. Store and Export Trained Model

The machine learning tool 102 can include a storage module 120 to store the trained and evaluated model in the memory of the computing system. The model can also be stored in a cloud storage accessible via a network (i.e., the Internet).

The machine learning tool 102 can also include an export/import module 122. The export/import module 122 can convert the trained model to a lines of code for incorporation into an application. The trained model exportation can be done in an integration development environment. The code exportation can be as simple as dragging the icon for the trained model into a file folder for the application.

The export/import module 122 can also allow a developer to import model saved in a memory of the computing device. Once imported the model can be retrained using additional training data and reevaluated using additional test data.

II. Techniques for Using a Graphical User Interface to Generate a Machine Learning Model The techniques disclose a graphical user interface for easily building a machine learning model. These techniques can be used by a novice developer that may have little machine learning language programming experience. The user interface walks the developer through selecting the template based on the type of the model, selecting the training data, identifying the testing data, and exporting the trained model. The techniques also can utilize real time sensor information from one or more devices to evaluate the trained model.

Figure 9:
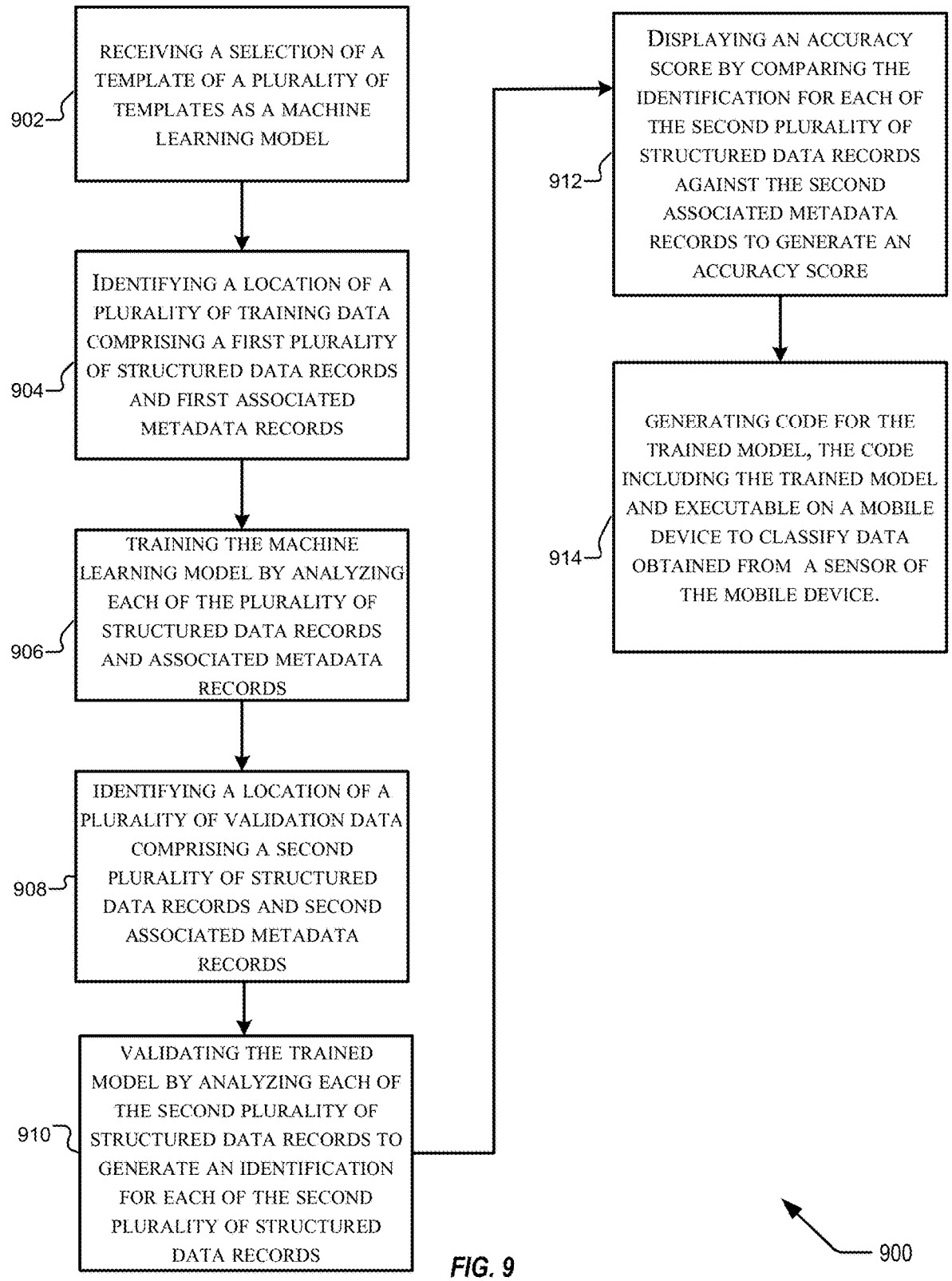
FIG. 9 is an exemplary flowchart for a technique for generating trained machine learning models for application development.

FIG. 9 depicts a flowchart for a process 900 for techniques for using a graphical user interface to generate a machine learning model. The method can be performed on an electronic device (e.g., a portable computer, a desktop computer, or a tablet computer).

At 902, the technique can include receiving a selection of a template of a plurality of templates as a machine learning model, each template corresponding to a classification of a type of data. The selection can be made via a user interface. The templates can be presented on a graphical user interface. The templates can be presented by class of multiple classes. The classes can include images, text, sound, motion, and table. The template can be selected by interaction with a pointing device (e.g., a mouse, a trackball, a touch-screen display). The selection of the template can be indicated on the graphical user interface by highlighting or changing the color and/or shading of an icon and label on a display.

At 904, the technique can include identifying a location of a plurality of training data comprising a first plurality of structured data records and first associated metadata records, each metadata record of the first associated metadata records identifying at least a classification label of the first plurality of structured data records. The training data can be located using a drop down menu on the graphical user interface. The training data can be located in a folder stored in a memory of the computing device. The training data can be located in a folder in a database in a cloud-based network. A developer identify the location of the training data by dragging and dropping the selected training data to the designed training data box on the graphical user interface.

In some embodiments, the technique can include analyzing the plurality of training data to determine a number of classes. In some embodiments, the technique can determine if each of the number of classes is consistent with the plurality of training data. In this way the technique can generate an error or alert if e.g. audio training data is identified for an image classifier or vice versa. The technique can further include selecting one of more classes of a plurality of determined classes for training the machine learning (ML) model. A developer may want to exclude one or more determined classes while training the model. For example, the developer can exclude "roses" from the classes for a flower classifier. The number of determined classes can be displayed on the graphical user interface.

At 906, the technique can include training the machine learning (ML) model by analyzing each of the first plurality of structured data records and the first associated metadata records. The training can analyze each of the plurality of the structured data records and the first associated metadata records for one or more elements in order to train the model. The elements can depend on the type of classifier. For example, image elements can be identified for an image classifier, text elements can be used for a text analyzer, etc.

At 908, the technique can include identifying a location of a plurality of validation data comprising a second plurality of structured data records and second associated metadata records, each metadata record of the second associated metadata records identifying at least the classification label of the second plurality of structured data records. The validation data can be located using a drop down menu on the graphical user interface. The validation data can be located in a folder stored in a memory of the computing device. The validation data can be located in a folder in a database in a cloud-based network. A developer identify the location of the validation data by dragging and dropping the selected training data to the designed training data box on the graphical user interface. The technique can also receive a selection that the plurality of validation data can automatically be selected from a portion of the training data (i.e., 10% of the training data can be held back and not used for training but used for validation).

At 910, the technique can include validating the trained model by analyzing each of the second plurality of structured data records to generate an identification for each of the second plurality of structured data records. The accuracy of the trained data can be determined by comparing the identified classification with the classification label in the metadata for the second plurality of structured data records. The precision and recall and be calculated for each class of data.

At 912, the technique can include displaying an accuracy score by comparing the identification for each of the second plurality of structured data records against the second associated metadata records to generate the accuracy score. The validation accuracy can be calculated and displayed on a graphical user interface as a numerical percentage or plotted over the number of iterations in a line plot during training. The precision and recall and be displayed for each class of data.

At 914, the technique can include generating code for the trained model, the code including the trained model and executable on a mobile device to classify data obtained from a sensor of the mobile device. In various embodiments, the code can be executable code. The code can be save as a file. As the file can include executable code, the model can be run on other mobile devices (e.g., a smartphone, a wearable device, or tablet computing device). In this way, the developer can test the machine learning model on devices for one or more beta testers without having to complete the coding for the application. Testing with images, sound, or motion received from the other mobile devices provided the developer real-world insights on how the model works from actual sensors on the mobile devices. The sensor can include a camera, a microphone a motion sensor (e.g., an accelerometer), a keyboard, a keypad, or a touch-screen display. In some embodiments, the techniques can receive feedback from the one or more beta users on the accuracy of the classification provided by the model.

In some embodiments, the technique can include analyzing the plurality of training data to determine a number of classes, each class corresponding to a different classification label. The technique can include comparing the classification label for the plurality of training data to determine consistency with the category of the type of data.

In some embodiments, the technique can include analyzing the plurality of training data to determine a number of classes, each class corresponding to a different classification label. The technique can include displaying a list of the classes of the plurality of training data on the graphical user interface. The technique can include receiving a selection of one of more classes of a plurality of the classes for training the machine learning model.

In some embodiments, the technique can include displaying a list of the classes of the plurality of training data on the graphical user interface. The technique can include receiving a selection of one or more classes of a plurality of the classes for training the machine learning model.

In some embodiments, the technique can include receiving the identification of the location of the plurality of training data by selecting an icon associated with the training data and dragging the icon onto a designated area on the graphical user interface.

In some embodiments identifying the location of the plurality of validation data comprises automatically selecting a random portion of the training data. The random portion of the training data can be withheld from training the machine learning model.

In some embodiments, the technique can include receiving a selection that the plurality of validation data is to be automatically selected from the training data. The technique can include withholding a preselected percentage of the training data from the training. The withheld training data can include the second plurality of structured data records. The technique can include validating the trained model by analyzing each of the second plurality of structured data records to generate the identification for each of the second plurality of structured data records and the second associated metadata records. The technique can include generating the accuracy score by comparing the identification for each of the second plurality of structured data records against the second associated metadata records.

The technique can include detecting reaching a threshold for the plurality of training data. The threshold can be a number of training data records needed to generate the machine language model. The technique can include automatically training the machine learning model upon identification of the threshold amount of training data. The technique can include generating the code for the trained model.

In various aspects, a computing device, including one or more memories and one or more processors in communication with the one or more memories and configured to execute instructions stored in the one or more memories to performing any of the operations disclosed herein.

In various aspects, a non-transitory computer-readable medium storing a plurality of instructions that, when executed by one or more processors of a computing device, cause the one or more processors of the computing device to perform operations comprising any of the operations disclosed herein.

It should be appreciated that the specific steps illustrated in FIG. 9 provide particular techniques for capturing and aggregating operational metrics for a third party application according to various embodiments of the present disclosure. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

III. Exemplary Devices

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it can be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

The computing device can be a laptop computer with the data saved locally in memory. Alternatively, multiple computing devices can be used for distributed processing with data located in a cloud service. The machine learning tool can also be executed on a tablet computer.

Figure 10:
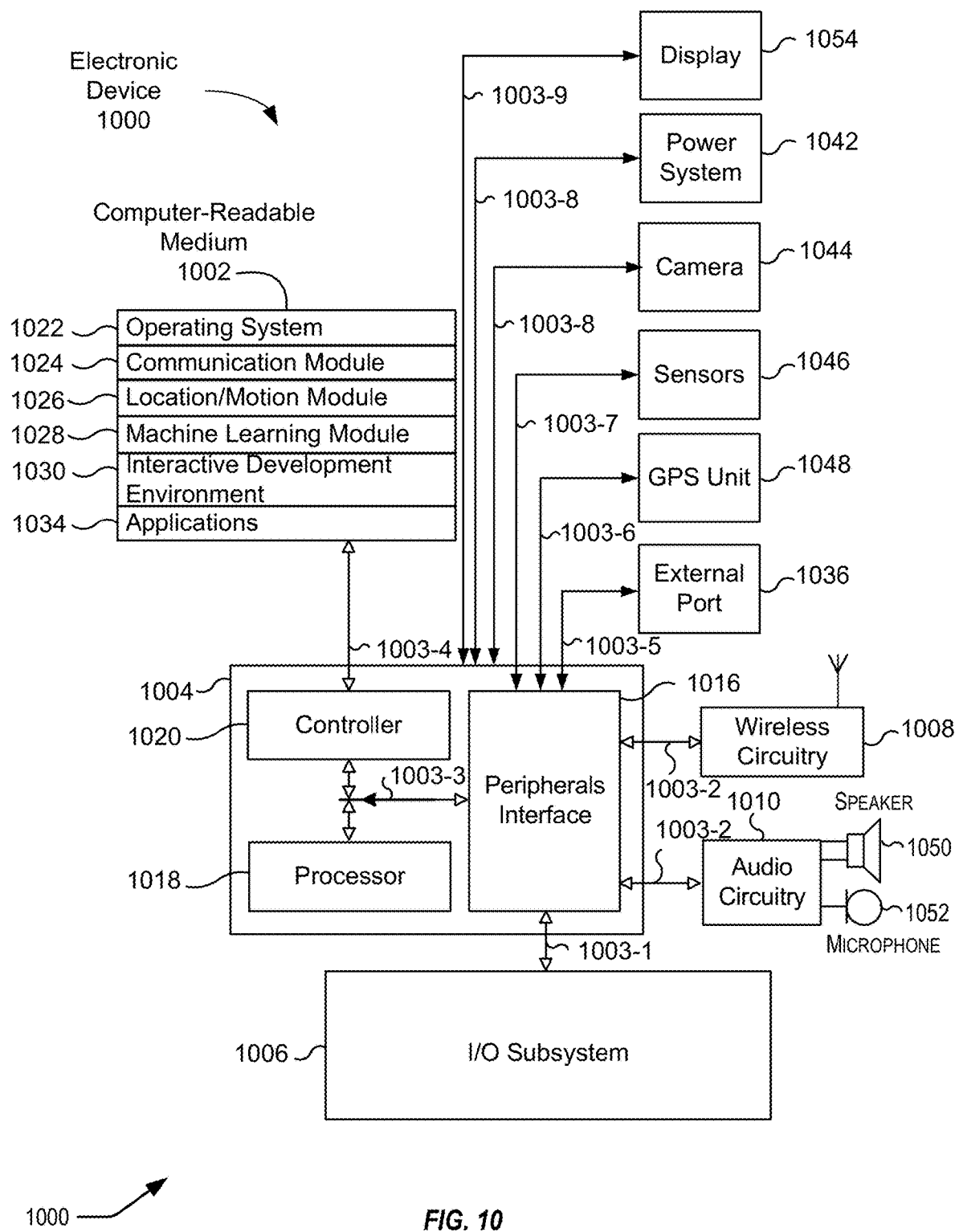
FIG. 10 illustrates a block diagram for an exemplary device to perform the one or more techniques described herein.

FIG. 10 is a block diagram of an exemplary device 1000, which may be a mobile device upon which the techniques can performed. Device 1000 generally includes computer-readable medium (memory) 1002, a processing system 1004, an Input/Output (I/O) subsystem 1006, wireless circuitry 1008, and audio circuitry 1010 including speaker 1050 and microphone 1052. These components may be coupled by one or more communication buses or signal lines 1003. Device 1000 can be any portable electronic device, including a handheld computer, a tablet computer, a mobile phone, laptop computer, tablet device, media player, a wearable device, personal digital assistant (PDA), a key fob, a car key, an access card, a multifunction device, a mobile phone, a portable gaming device, a car display unit, or the like, including a combination of two or more of these items.

The device 1000 can be a multifunction device having a display 1054. The display 1054 can be a touch screen in accordance with some embodiments. The touch screen optionally displays one or more graphics within user interface (UI). In some embodiments, a user is enabled to select one or more of the graphics by making a gesture on the graphics, for example, with one or more fingers or one or more styluses. In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 1000. In some implementations or circumstances, inadvertent contact with a graphic does not select the graphic. For example, a swipe gesture that sweeps over an application icon optionally does not select the corresponding application when the gesture corresponding to selection is a tap. Device 1000 can optionally also include one or more physical buttons, such as "home" or menu button. As menu button is, optionally, used to navigate to any application in a set of applications that are, optionally, executed on the device 1000. Alternatively, in some embodiments, the menu button is implemented as a soft key in a graphical user interface displayed on touch screen.

The device 1000 can incorporate a display 1054. The display 1054 can be a liquid crystal display (LCD), organic light emitting diode (OLED), active matrix organic light emitting diode (AMOLED), Super active matrix light emitting diode (AMOLED), thin-film transistor (TFT), in-plane switching (IPS), or thin-film transistor liquid crystal display (TFT-LCD) that typically can be found a computing device. The display 1054 may be a touch screen display of a computing device.

In one embodiment, device 1000 includes touch screen, menu button, push button for powering the device on/off and locking the device, volume adjustment button(s), Subscriber Identity Module (SIM) card slot, head set jack, and docking/charging external port. Push button is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1000 also accepts verbal input for activation or deactivation of some functions through microphone. Device 1000 also, optionally, includes one or more contact intensity sensors for detecting intensity of contacts on touch screen and/or one or more tactile output generators for generating tactile outputs for a user of device 1000.

In one illustrative configuration, device 1000 may include at least one computer-readable medium (memory) 1002 and one or more processing units (or processor(s)) 1018. Processor(s) 1018 may be implemented as appropriate in hardware, software, or combinations thereof. Computer-executable instruction or firmware implementations of processor(s) 1018 may include computer-executable instructions written in any suitable programming language to perform the various functions described.

Computer-readable medium (memory) 1002 may store program instructions that are loadable and executable on processor(s) 1018, as well as data generated during the execution of these programs. Depending on the configuration and type of device 1000, memory 1002 may be volatile (such as random access memory (RAM)) and/or non-volatile (such as read-only memory (ROM), flash memory, etc.). Device 1000 can have one or more memories. Device 1000 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the devices. In some implementations, memory 1002 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

Memory 1002 and additional storage, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. Memory 1002 and additional storage are both examples of non-transitory computer storage media. Additional types of computer storage media that may be present in device 1000 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by device 1000. Combinations of any of the above should also be included within the scope of non-transitory computer-readable storage media. Based on the disclosure and teachings provided herein, a person of ordinary skill in the art can appreciate other ways and/or methods to implement the various embodiments. However, as noted above, computer-readable storage media does not include transitory media such as carrier waves or the like.

Alternatively, computer-readable communication media may include computer-readable instructions, program modules, or other data transmitted within a data signal, such as a carrier wave, or other transmission. However, as used herein, computer-readable storage media does not include computer-readable communication media.

Device 1000 may also contain communications connection(s) 1008 that allow device 1000 to communicate with a data store, another device or server, user terminals and/or other devices via one or more networks. Such networks may include any one or a combination of many different types of networks, such as cable networks, the Internet, wireless networks, cellular networks, satellite networks, other private and/or public networks, or any combination thereof. Device 1000 may also include I/O device(s) 1006, such as a touch input device, a keyboard, a mouse, a pen, a voice input device, a display, a speaker, a printer, etc.

It should be apparent that the architecture shown in FIG. 10 is only one example of an architecture for device 1000, and that device 1000 can have more or fewer components than shown, or a different configuration of components. The various components shown in FIG. 10 can be implemented in hardware, software, or a combination of both hardware and software, including one or more signal processing and/or application specific integrated circuits.

Wireless circuitry 1008 is used to send and receive information over a wireless link or network to one or more other devices' conventional circuitry such as an antenna system, a radio frequency (RF) transceiver, one or more amplifiers, a tuner, one or more oscillators, a digital signal processor, a codec chipset, memory, etc. Wireless circuitry 1008 can use various protocols, e.g., as described herein. For example, wireless circuitry 1008 can have one component for one wireless protocol (e.g., Bluetooth®) and a separate component for another wireless protocol (e.g., ultra-wide band ((UWB). Different antennas can be used for the different protocols.

Wireless circuitry 1008 is coupled to processing system 1004 via peripherals interface 1016. Interface 1016 can include conventional components for establishing and maintaining communication between peripherals and processing system 1004. Voice and data information received by wireless circuitry 1008 (e.g., in speech recognition or voice command applications) is sent to one or more processors 1018 via peripherals interface 1016. One or more processors 1018 are configurable to process various data formats for one or more application programs 1034 stored on computer-readable medium (memory) 1002.

Peripherals interface 1016 couple the input and output peripherals of the device to processor(s) 1018 and computer-readable medium 1002. One or more processors 1018 communicate with computer-readable medium 1002 via a controller 1020. Computer-readable medium 1002 can be any device or medium that can store code and/or data for use by one or more processors 1018. Medium 1002 can include a memory hierarchy, including cache, main memory and secondary memory.

Device 1000 also includes a power system 1042 for powering the various hardware components. Power system 1042 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1000 includes a camera 1044. In some embodiments, device 1000 includes sensors 1046. Sensors 1046 can include accelerometers, compasses, gyrometers, pressure sensors, audio sensors, light sensors, barometers, and the like. Sensors 1046 can be used to sense location aspects, such as auditory or light signatures of a location.

In some embodiments, device 1000 can include a GPS receiver, sometimes referred to as a GPS unit 1048. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1018 run various software components stored in medium 1002 to perform various functions for device 1000. In some embodiments, the software components include an operating system 1022, a communication module (or set of instructions) 1024, a location module (or set of instructions) 1026, a machine learning module 1028, an interactive development environment 1030, and other applications (or set of instructions) 1034.

Operating system 1022 can be any suitable operating system, including iOS, Macintosh Operating System (Mac OS), Darwin, Quadros Real-Time Operating System (RTXC), LINUX, UNIX, OS X, Microsoft Windows, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components. An operating system 1022 is system software that manages computer hardware and software resources and provides common services for computer programs. For example, the operating system 1022 can manage the interaction between the user interface module and one or more user application(s). The various embodiments further can be implemented in a wide variety of operating environments, which in some cases can include one or more user computers, devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Communication module 1024 facilitates communication with other devices over one or more external ports 1036 or via wireless circuitry 1008 and includes various software components for handling data received from wireless circuitry 1008 and/or external port 1036. External port 1036 (e.g., universal serial bus (USB), FireWire, Lightning connector, 60-pin connector, etc.) is adapted for coupling directly to other devices or indirectly over a network (e.g., the Internet, wireless local-area network (LAN), etc.).

Location/motion module 1026 can assist in determining the current position (e.g., coordinates or other geographic location identifiers) and motion of device 1000. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1026 receives data from GPS unit 1048 and analyzes the signals to determine the current position of the mobile device. In some embodiments, location/motion module 1026 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1008 and is passed to location/motion module 1026. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1000 based on the position coordinates of the corresponding transmitters. Regardless of the specific location technology used, location/motion module 1026 receives information from which a location fix can be derived, interprets that information, and returns location information, such as geographic coordinates, latitude/longitude, or other location fix data.

The electronic device can include a machine learning module 1028. The machine learning module 1028 receive a selection of one or more model templates, intake a plurality of training data, train the model on the training data, validate the model and generate an executable file for the trained model.

The electronic device can also include an interactive development environment 1030. The interactive development environment in an operating system 1022 can include a suite of software development tools for developers to generate software applications. The integrated development environment 1030 can support source code for the following programming languages: C, C++, Objective-C, Objective-C++, Java, AppleScript, Python, Ruby, ResEdit (Rez), and Swift, with a variety of programming models, including but not limited to Cocoa, Carbon, and Java. Some integrated development environments also support GNU Pascal, Free Pascal, Ada, C#, Perl, and D.

The integrated development environment 1030 can include developer documentation, a built-in Interface Builder, an application used to construct graphical user interfaces. Versions of the integrated development environment can include a modified version of the GNU Compiler Collection. The integrated development environment 1030 can support development for mini-computers, portable computing system operating systems, smartphones, wearable devices, media access devices, and software development kits. The integrated development environment 1030 can also include downloadable simulators.

The one or more applications programs 1034 on the mobile device can include any applications installed on the device 1000, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or advanced audio coding (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1006 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1006 can include a display and user input devices such as a keyboard, mouse, and/or track pad. In some embodiments, I/O subsystem 1006 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1002) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1000 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art can appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Most embodiments utilize at least one network that would be familiar to those skilled in the art for supporting communications using any of a variety of commercially-available protocols, such as transmission control protocol/internet protocol (TCP/IP), open systems interconnection model (OSI), file transfer protocol (FTP), universal plug and play (UPnP), network file system (NFS), common internet file system (CIFS), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HyperText Transfer Protocol (HTTP) servers, file transfer protocol (FTP) servers, common gateway interface (CGI) servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle °, Microsoft®, Sybase® and IBM®.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically can include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other devices such as network input/output devices may be employed.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

The specification and drawings are, accordingly, to be regarded in an illustrative rather than a restrictive sense. It can, however, be evident that various modifications and changes may be made thereunto without departing from the broader spirit and scope of the disclosure as set forth in the claims.

As described above, one aspect of the present technology is the gathering and use of data available from various sources to display rectangular content in non-rectangular areas. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used display information regarding operation metrics for third party application. Accordingly, use of such personal information data can be presented to a user on the display. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data can comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of third party application evaluation techniques, the present technology can be configured to allow users to select to "opt in" or "opt out" of participation in the collection of personal information data during registration for services or anytime thereafter. In another example, users can select not to provide personal information to be displayed. In yet another example, users can select to limit amount of personal data is maintained or entirely prohibit the display of personal data. In addition to providing "opt in" and "opt out" options, the present disclosure contemplates providing notifications relating to the access or use of personal information. For instance, a user may be notified upon downloading an app that their personal information data can be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the third party application evaluation techniques, or publicly available information.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for using graphical user interface to generate a machine learning model, the method, performed by an electronic device, comprising:
    receiving, via a user interface, a selection of a template of a plurality of templates defining a machine learning model, each template corresponding to a category of a type of data, wherein the category of the type of data comprises one of images, text, sound, or tabular data;
    identifying a location of a plurality of training data comprising a first plurality of structured data records and first associated metadata records, each metadata record of the first associated metadata records identifying at least a classification label of the first plurality of structured data records;
    training the machine learning model by analyzing each of the first plurality of structured data records and the first associated metadata records to generate a trained model;
    identifying a location of a plurality of validation data comprising a second plurality of structured data records and second associated metadata records, each metadata record of the second associated metadata records identifying at least the classification label of the second plurality of structured data records;
    validating the trained model by analyzing each of the second plurality of structured data records to generate an identification for each of the second plurality of structured data records;
    displaying an accuracy score of the identification provided by the machine learning model that is generated by comparing the identification for each of the second plurality of structured data records against the second associated metadata records; and
    generating executable code for the trained model, the executable code including the trained model and executable on a mobile device to classify data obtained from a sensor of the mobile device, wherein the sensor corresponds to the type of data of the selected template.

2. The method of claim 1, further comprising:
    analyzing the plurality of training data to determine a number of classes, each class corresponding to a different classification label; and
    comparing the classification label for the plurality of training data to determine consistency with the category of the type of data.

3. The method of claim 1, further comprising:
    analyzing the plurality of training data to determine a number of classes, each class corresponding to a different classification label;
    displaying a list of the classes of the plurality of training data on the graphical user interface; and
    receiving a selection of one of more classes of a plurality of the classes for training the machine learning model.

4. The method of claim 1, further comprising:
    displaying a list of the classes of the plurality of training data on the graphical user interface; and
    receiving a selection of one of more classes of a plurality of the classes for training the machine learning model.

5. The method of claim 1, further comprising receiving the identification of the location of the plurality of training data by selecting an icon associated with the training data and dragging the icon onto a designated area on the graphical user interface.

6. The method of claim 1, wherein identifying the location of the plurality of validation data comprises automatically selecting a random portion of the training data, wherein the random portion of the training data is withheld from training the machine learning model.

7. The method of claim 1, further comprising:
    receiving a selection that the plurality of validation data is to be automatically selected from the training data;
    withholding a preselected percentage of the training data from the training, the withheld training data comprising the second plurality of structured data records;
    validating the trained model by analyzing each of the second plurality of structured data records to generate the identification for each of the second plurality of structured data records and the second associated metadata records; and
    generating the accuracy score by comparing the identification for each of the second plurality of structured data records against the second associated metadata records.

8. The method of claim 1, further comprising:
    detecting reaching a threshold for the plurality of training data; and
    automatically training the machine learning model; and
    generating the executable code for the trained model.

9. A computing device, comprising:
    one or more memories; and
    one or more processors in communication with the one or more memories and configured to execute instructions stored in the one or more memories to performing operations comprising:
        receiving, via a user interface, a selection of a template of a plurality of templates defining a machine learning model, each template corresponding to a category of a type of data, wherein the category of the type of data comprises one of images, text, sound, or tabular data;
        identifying a location of a plurality of training data comprising a first plurality of structured data records and first associated metadata records, each metadata record of the first associated metadata records identifying at least a classification label of the first plurality of structured data records;
        training the machine learning model by analyzing each of the first plurality of structured data records and the first associated metadata records to generate a trained model;
        identifying a location of a plurality of validation data comprising a second plurality of structured data records and second associated metadata records, each metadata record of the second associated metadata records identifying at least the classification label of the second plurality of structured data records;
        validating the trained model by analyzing each of the second plurality of structured data records to generate an identification for each of the second plurality of structured data records;
        displaying an accuracy score of the identification provided by the machine learning model that is generated by comparing the identification for each of the second plurality of structured data records against the second associated metadata records; and generating executable code for the trained model, the executable code including the trained model and executable on a mobile device to classify data obtained from a sensor of the mobile device, wherein the sensor corresponds to the type of data of the selected template.

10. The computing device of claim 9, further comprising instructions stored in the one or more memories to performing operations comprising:
analyzing the plurality of training data to determine a number of classes, each class corresponding to a different classification label; and
comparing the classification label for the plurality of training data to determine consistency with the category of the type of data.

11. The computing device of claim 9, further comprising instructions stored in the one or more memories to performing operations comprising:
analyzing the plurality of training data to determine a number of classes, each class corresponding to a different classification label;
displaying a list of the classes of the plurality of training data on a graphical user interface; and
receiving a selection of one of more classes of a plurality of the classes for training the machine learning model.

12. The computing device of claim 9, further comprising instructions stored in the one or more memories to performing operations comprising:
displaying a list of the classes of the plurality of training data on the user interface; and
receiving a selection of one of more classes of a plurality of the classes for training the machine learning model.

13. The computing device of claim 9, further comprising instructions stored in the one or more memories to performing operations comprising receiving the identification of the location of the plurality of training data by selecting an icon associated with the training data and dragging the icon onto a designated area on a graphical user interface.

14. The computing device of claim 9, wherein identifying the location of the plurality of validation data comprises automatically selecting a random portion of the training data, wherein the random portion of the training data is withheld from training the machine learning model.

15. The computing device of claim 9, further comprising instructions stored in the one or more memories to performing operations comprising:
receiving a selection that the plurality of validation data is to be automatically selected from the training data;
withholding a preselected percentage of the training data from the training, the withheld training data comprising the second plurality of structured data records;
validating the trained model by analyzing each of the second plurality of structured data records to generate the identification for each of the second plurality of structured data records and the second associated metadata records; and
generating the accuracy score by comparing the identification for each of the second plurality of structured data records against the second associated metadata records.

16. The computing device of claim 9, further comprising instructions stored in the one or more memories to performing operations comprising:
detecting reaching a threshold for the plurality of training data; and
automatically training the machine learning model; and generating the executable code for the trained model.

17. A non-transitory computer-readable medium storing a plurality of instructions that, when executed by one or more processors of a computing device, cause the one or more processors of the computing device to perform operations comprising:
receiving, via a user interface, a selection of a template of a plurality of templates defining a machine learning model, each template corresponding to a category of a type of data, wherein the category of the type of data comprises one of images, text, sound, or tabular data;
identifying a location of a plurality of training data comprising a first plurality of structured data records and first associated metadata records, each metadata record of the first associated metadata records identifying at least a classification label of the first plurality of structured data records;
training the machine learning model by analyzing each of the first plurality of structured data records and the first associated metadata records to generate a trained model;
identifying a location of a plurality of validation data comprising a second plurality of structured data records and second associated metadata records, each metadata record of the second associated metadata records identifying at least the classification label of the second plurality of structured data records;
validating the trained model by analyzing each of the second plurality of structured data records to generate an identification for each of the second plurality of structured data records;
displaying an accuracy score of the identification provided by the machine learning model that is generated by comparing the identification for each of the second plurality of structured data records against the second associated metadata records; and
generating executable code for the trained model, the executable code including the trained model and executable on a mobile device to classify data obtained from a sensor of the mobile device, wherein the sensor corresponds to the type of data of the selected template.

18. The non-transitory computer-readable medium of claim 17, further instructions that, when executed by one or more processors of the computing device, cause the one or more processors of the computing device to perform operations comprising:
analyzing the plurality of training data to determine a number of classes, each class corresponding to a different classification label, and
comparing the classification label for the plurality of training data to determine consistency with the category of the type of data.

19. The non-transitory computer-readable medium of claim 17 further instructions that, when executed by one or more processors of the computing device, cause the one or more processors of the computing device to perform operations comprising:
analyzing the plurality of training data to determine a number of classes, each class corresponding to a different classification label;
displaying a list of the classes of the plurality of training data on a graphical user interface; and
receiving a selection of one of more classes of a plurality of the classes for training the machine learning model.

20. The non-transitory computer-readable medium of claim 17, further instructions that, when executed by one or more processors of the computing device, cause the one or more processors of the computing device to perform operations comprising:
- receiving a selection that the plurality of validation data is to be automatically selected from the training data;
- withholding a preselected percentage of the training data from the training, the withheld training data comprising the second plurality of structured data records;
- validating the trained model by analyzing each of the second plurality of structured data records to generate the identification for each of the second plurality of structured data records and the second associated metadata records; and
- generating the accuracy score by comparing the identification for each of the second plurality of structured data records against the second associated metadata records.

* * * * *

UNITED STATES PATENT AND TRADEMARK OFFICE
CERTIFICATE OF CORRECTION

| | | |
|---|---|---|
| PATENT NO. | : 11,783,223 B2 | Page 1 of 1 |
| APPLICATION NO. | : 16/670914 | |
| DATED | : October 10, 2023 | |
| INVENTOR(S) | : Siracusa et al. | |

It is certified that error appears in the above-identified patent and that said Letters Patent is hereby corrected as shown below:

On the Title Page

Item (54) and in the Specification Column 1, Lines 1-2 Replace "TECHNIQUES FOR MACHINE LANGUAGE MODEL CREATION" with --MACHINE LEARNING MODEL CREATION--

Signed and Sealed this
Twenty-first Day of November, 2023

Katherine Kelly Vidal
*Director of the United States Patent and Trademark Office*